(12) United States Patent
Arzumanyan et al.

(10) Patent No.: US 9,062,358 B2
(45) Date of Patent: Jun. 23, 2015

(54) EXTRACTION OF GOLD FROM FINE CARBON RESIDUE

(71) Applicants: Ruben Arzumanyan, Yerevan (AM);
Vladimir Matosyan, Yerevan (AM)

(72) Inventors: Ruben Arzumanyan, Yerevan (AM);
Vladimir Matosyan, Yerevan (AM)

(73) Assignee: SOTAGOLD, LLC, Sherman Oaks, CA (US)

( * ) Notice: Subject to any disclaimer, the term of this patent is extended or adjusted under 35 U.S.C. 154(b) by 206 days.

(21) Appl. No.: 13/858,415

(22) Filed: Apr. 8, 2013

(65) Prior Publication Data

US 2014/0298954 A1    Oct. 9, 2014

(51) Int. Cl.
| | |
|---|---|
| *C22B 11/00* | (2006.01) |
| *C22B 3/00* | (2006.01) |
| *C22B 3/20* | (2006.01) |
| *C22B 11/02* | (2006.01) |

(52) U.S. Cl.
CPC ............. *C22B 11/044* (2013.01); *C22B 3/0098* (2013.01); *C22B 11/023* (2013.01)

(58) Field of Classification Search
CPC .... C22B 3/0098; C22B 11/023; C22B 11/044
USPC ................. 75/426, 423; 423/24, 27
See application file for complete search history.

(56) References Cited

U.S. PATENT DOCUMENTS

| | | | |
|---|---|---|---|
| 1,617,206 A * | 2/1927 | Feild ............................... | 75/428 |
| 4,259,107 A | 3/1981 | Guay | |
| 5,380,504 A | 1/1995 | Lindquist et al. | |
| 5,413,288 A | 5/1995 | Inui et al. | |
| 6,228,334 B1 | 5/2001 | Hill et al. | |
| 7,060,121 B2 | 6/2006 | Lin et al. | |
| 2003/0039605 A1* | 2/2003 | Ramsay ........................ | 423/460 |
| 2014/0026715 A1* | 1/2014 | Zimmermann et al. ........ | 75/711 |

FOREIGN PATENT DOCUMENTS

| | | |
|---|---|---|
| AM | 1790 A2 | 1/2006 |
| DE | 10 2011 016860 | 10/2012 |
| JP | 2009179873 | 8/2009 |
| WO | WO 9945158 A1 * | 9/1999 |

OTHER PUBLICATIONS

Grehl et al. Derwent Acc No. 2012-N29014 for the patent family incluing WO 2012140128 A1 published Oct. 18, 2012.*
Carbon. (2005). In the crystal reference encyclopedia. Retrieved from http://search.credoreference.com/content/entry/cre/carbon/0.*
Okuda et al. Machine translation of JP 2009-179873 A published Aug. 2009.*
Fluidization Engineering; 2nd edition; Octave Levenspiel et al.; 1991; pp. 456-459; Butterworth-Heinemann.
Chemical Reaction Engineering; Octave Levenspiel et al.; 1965 (Russian Translation Moscow—1969); pp. 330, 339, 344.

(Continued)

*Primary Examiner* — George Wyszomierski
*Assistant Examiner* — Tima M McGuthry Banks
(74) *Attorney, Agent, or Firm* — Patent Law Agency, LLC; Peter Ganjian

(57) ABSTRACT

Recovering gold from gold-loaded fine carbon by application of thermo-kinetic chemical activation regime at a low temperature, while preventing vitrification of imputies found in the gold-loaded fine carbon.

29 Claims, 4 Drawing Sheets

(56) References Cited

OTHER PUBLICATIONS

Chemical Engineers' Handbook; John H. Perry; Fourth Edition; 1963; pp. 20-24 to 20-25.
Chemical Engineers' Handbook; John H. Perry; 1963 (Russian Translation Leningrad—1969) pp. 255; Russian.
Chemical Reaction Engineering; 3rd Edition; Octave Levenspiel; 1999; John Wiley & Sons; pp. 584 to 585.
Industrial Pseudo-Liquidation; D. Kunii and O. Levenshpil; Moscow, Publisher "Chemistry" 1976; pp. 411 to 414.
Carbon Regeneration Kiln Brochure; www.ansac.com.au; Date: 2002.
Engineering Drawing of a Kiln from Denver Mineral Engineering, Inc. Jul. 3, 1997.
Figures of Rotary Kiln Regeneration System (plan and elevation views); p. 10; Aug. 1980.
Gold Extraction and Recovery Processes; Mar. 2009; Wong Wai Leong Eugene; National University of Singapore.
Bureau of Mines Information Circular; 1978; Processing of Gold Ores Using Heap Leach-Carbon Adsorption Methods; U.S. Department of Interior; H. J. Heinen et al.
Gold Recovery with Purolite A100/2412 ion exchange resin; Dec. 2011.
PCT/US2014/031518 ; International Search Report and Written Opinion ; Aug. 20, 2014.
Amankwah et al; Recovery of Gold From Waste Activated Carbon; Minerlals and Metallurgical Processing, Co. vol. 13, No. 3, Jan. 1, 1996; pp. 131-134.

* cited by examiner

EXTRACTION OF GOLD FROM FINE CARBON RESIDUE

BACKGROUND OF THE INVENTION

1. Field of the Invention

The present invention relates in general to system and method of gold recovery and in particular, to a method of recovering gold from fine carbon residue produced during a process in which gold is recovered from its ores using activated coarse carbon.

2. Description of Related Art

The processes in which gold is recovered from its ores using activated coarse carbon are very well known and have been in use for a number of years. The disadvantage of the conventional coarse carbon gold recovery methods is that during the process of gold recovery, the activated coarse carbon is eventually reduced in size into a gold-loaded fine carbon, which are disposed in the tailings as waste due to the very high cost of recovering (or extracting) the remaining gold from the gold-loaded fine carbon.

Accordingly, there is a need for recovery of gold from gold-loaded fine carbon, which due to its high dispersion ability and developed surface accumulates significant quantity of precious metal, but resists processing by known methods.

BRIEF SUMMARY OF THE INVENTION

A non-limiting, exemplary aspect of the present invention provides a method for recovering gold from gold-loaded fine carbon, comprising:
oxidizing the gold-loaded fine carbon, resulting in a non-carbonaceous gold-bearing residue M.

Another non-limiting, exemplary aspect of the present invention provides a method for recovering gold from gold-loaded fine carbon comprising:
mechanical and chemical treatment of gold-loaded fine carbon concurrently with thermal application in presence of one or more oxidation facilitator compounds and one or more sources of oxygen, resulting in a non-carbonaceous gold-bearing residue M while preventing vitrification of impurities found in the gold-loaded fine carbon that block recovery of gold.

Such stated advantages of the invention are only examples and should not be construed as limiting the present invention. These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" may be used to mean "serving as an example, instance, or illustration," but the absence of the term "exemplary" does not denote a limiting embodiment. Any embodiment described as "exemplary" is not necessarily to be construed as preferred or advantageous over other embodiments. In the drawings, like reference character(s) present corresponding part(s) throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Figure 1:
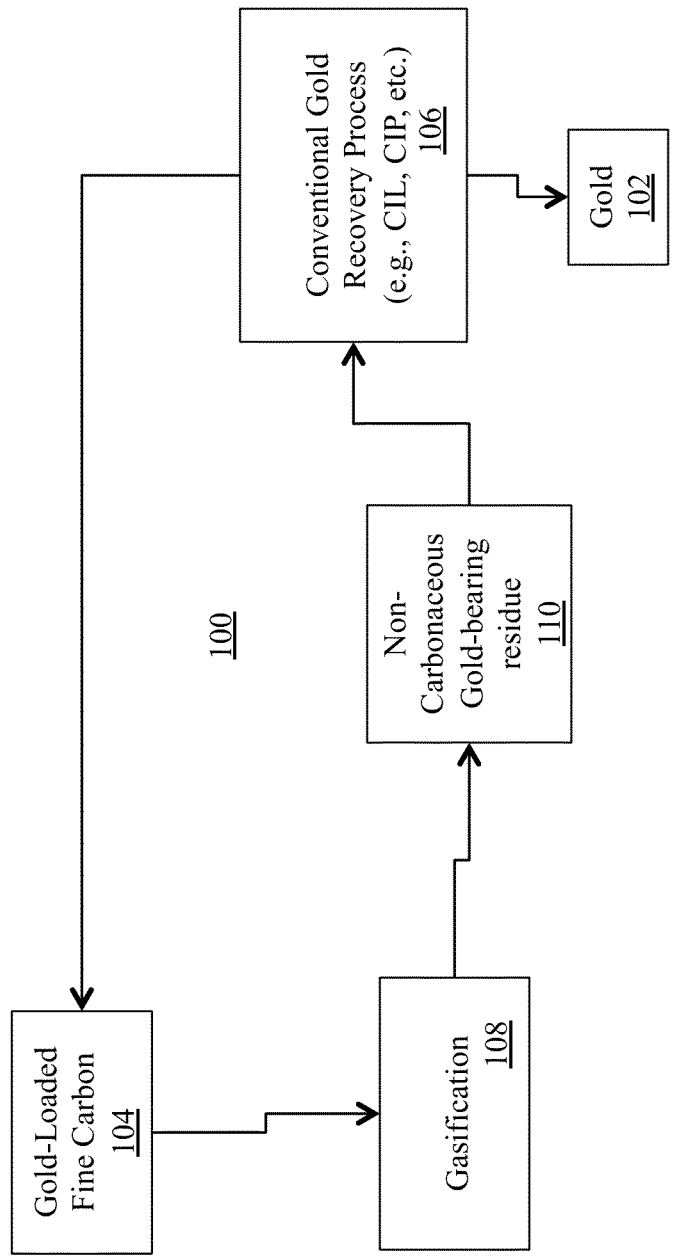
FIG. 1 is a non-limiting, exemplary system overview of extraction of gold from gold-loaded fine carbon in accordance with the present invention.

FIG. 1 is a non-limiting, exemplary system overview of extraction of gold from gold-loaded fine carbon in accordance with the present invention. As illustrated, the present invention provides a system and a method 100 for recovering gold 102 from gold-loaded fine carbon 104, which may have resulted from a conventional coarse carbon gold recovery process 106. The present invention provides a system and a method for low temperature gasification 108 of carbonaceous compounds (carbon particles) of the gold-loaded fine carbon 104, which results in a non-carbonaceous gold-bearing residue 110, where gold is recovered from the non-carbonaceous gold-bearing residue 110 by any well known conventional gold recovery methods 106. Non-limiting, non-exhaustive listings of examples of conventional gold recovery methods 106 may include, for example, Carbon-In-Leach, Carbon-In-Pulp, etc. The well-known methods use the well-known process of gold cyanidation technique for extracting gold from ore, than using the common process of Carbon-In-Pulp (CIP) or Carbon-In-Leach (CIL) for final recovery of the leached gold.

The low temperature gasification 108 of carbonaceous compounds (carbon particles) of the gold-loaded fine carbon 104 includes impregnating the gold-loaded fine carbon with oxygen, and then oxidizing of carbon particles of the oxygen impregnated gold-loaded fine carbon, which results in a non-carbonaceous gold-bearing residue M as follows:

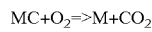

$$MC + O_2 => M + CO_2$$

where C is carbon, O is oxygen. Thereafter, gold from the non-carbonaceous gold-bearing residue 110 may be recovered by well known conventional gold recovery methods 106.

It should be noted that gold-loaded fine carbon 104 generally include graphite-like structures that are mixtures of oxides, silicates, and carbonates of Na, K, Si, and others ($SiO_2$, $Al_2O_3$, etc.) that increase their mechanical structural firmness and increase their resistance to chemical reaction (oxidation). Conventional methods may use application of high levels of thermal energy such as application of high temperatures of heat (higher than about 650° C.) to forcibly burn off the carbon particles of the gold-loaded fine carbon 104. However, application of high temperatures (higher than 650° C.) to forcibly burn the carbon particles generally results in the vitrification of the graphite-like structures of the gold-loaded fine carbon 104. As a result, any gold within the gold-loaded fine carbon 104 is encapsulated or covered within a vitreous film (or layer), preventing further extraction of gold. Accordingly, the present invention provides a system and a method 100 that enables oxidation of the carbon particles of the gold-loaded fine carbon 104 at low temperatures, which obviate difficulties related to any potential vitrification of the graphite-like structures of the gold-loaded fine carbon 104. As detailed below, the present invention provides a thermo-kinetic chemical activation regime to commence the low temperature oxidation (gasification process 108) of carbonaceous compounds (carbon particles) of the gold-loaded fine carbon 104, which results in the non-carbonaceous gold-bearing residue 110.

Figure 2A:
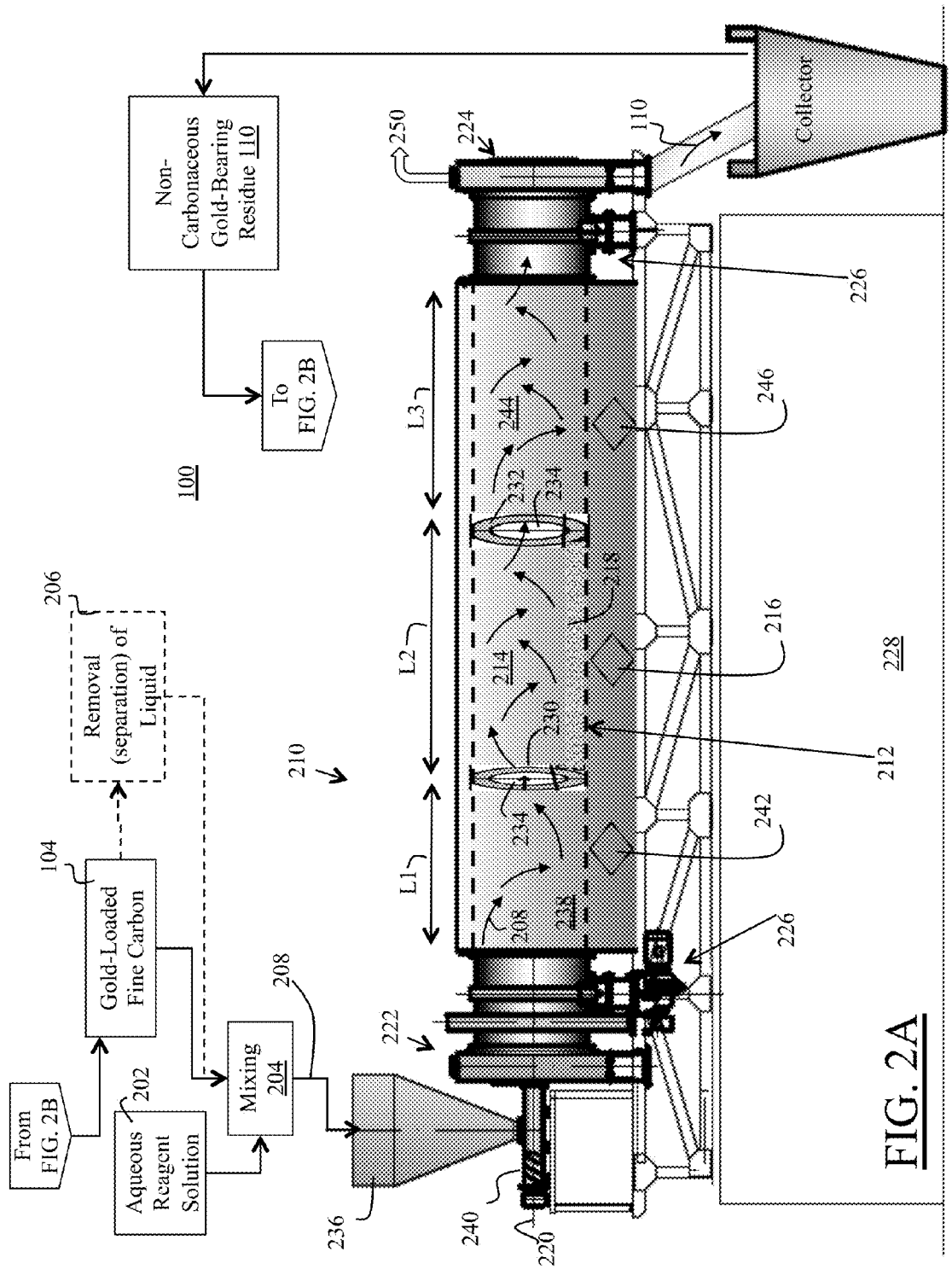
FIGS. 2A and 2B are non-limiting, exemplary detailed illustrations of a system and method of extraction of gold from gold-loaded fine carbon in accordance with the present invention.
Figure 2B:
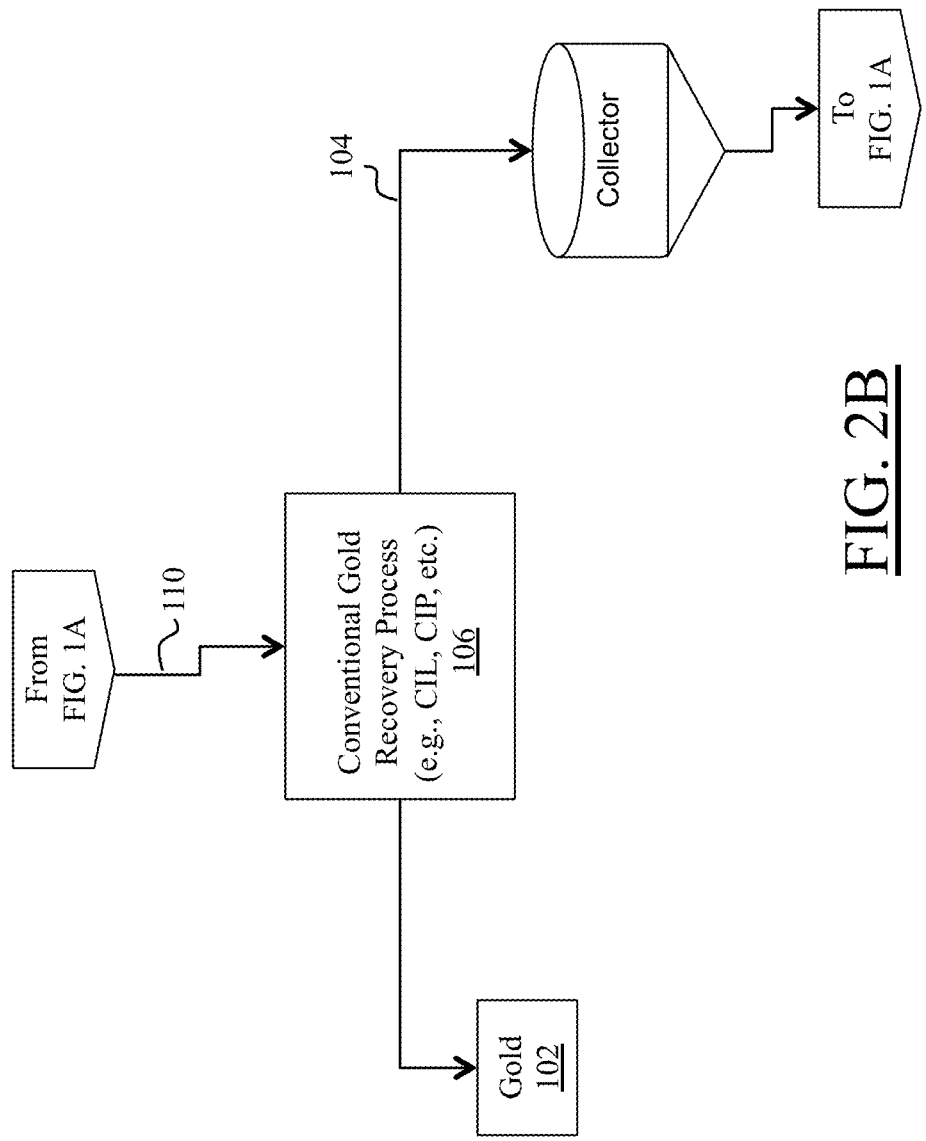

FIGS. 2A and 2B are non-limiting, exemplary detailed illustrations of a system and method of extraction of gold from gold-loaded fine carbon in accordance with the present invention. As illustrated and detailed further below, thermo-kinetic chemical activation regime of the present invention increases the speed of gasification of carbon particles of the gold-loaded fine carbons 104, and includes mechanical treatment of and concurrent thermal application (of less than 650° C.) to gold-loaded fine carbons 104 in the presence of oxidation facilitator compounds and oxygen sources (dopants). In general and as further detailed below, the mechanical treatment of the gold-loaded fine carbons 104 increase the surface areas and concentrations of defects of the graphite-like crystal structures therein, and the concurrent application of thermal energy intensifies the oxidation process in the presents of the oxidation facilitator compounds and oxygen sources (dopants).

As illustrated FIG. 2A, prior to the application of thermo-kinetic chemical activation regime of the present invention, the gold-loaded fine carbon 104 is first impregnated with oxygen using an aqueous reagent solution 202, which in general, is comprised of one or more oxidation facilitator compounds mixed with one or more sources of oxygen in water. Non-limiting, non-exhaustive listings of the one or more oxidation facilitator compounds may include a combination of oxides, but preferably, hydroxides of alkali metals, and the sources of oxygen may be derived from various oxygen reach dopants. Non-limiting, non-exhaustive listing of the oxygen reach dopants may be selected from nitrates (e.g., $KNO_3$, $NaNO_3$, $NH_4NO_3$), persulfates (e.g., $K_2S_2O_8$ ($NH_4$), $S_2O_8$, $Na_2S_2O_8$), permanganates (e.g., $KMnO_4$), or others.

In general, the hydroxides of alkali metals facilitate the oxidation process by the following well known processes:
  formations of phenolate groups, which deform and destruct Carbon-Carbon (C-C) bonds;
  Isomerization of phenolate groups of carbon derivatives with formation of carbonate and transfer charges;
  formations of intercalates that facilitate penetration of oxygen $O_2$ into interlayer space forming graphite oxide; and
  formations of potassium intercalcatus along with the graphite oxide, carbon atoms of which being in $SP^3$ orbital configuration contribute to disruptive oxidation of polycyclic natural structures with rupture of C-C bonds along peripheral areas of graphite and basic areas, which strongly accelerate the oxidation process.

Preparing the aqueous reagent solution 202 includes dissolving a predetermined quantity of hydroxides of alkali metals in water, and then adding of oxygen dopants to the aqueous solution of hydroxides of alkali metals to form the aqueous reagent solution 202. Thereafter, adding the gold-loaded fine carbon 104 to the aqueous reagent solution 202 while mixing the aqueous reagent solution in a mixer 204 to impregnate the gold-loaded fine carbon 104 with oxygen to generate a gold-loaded fine carbon that is impregnated with oxygen.

In general, as a non-limiting example, approximately 1 kg of the gold-loaded fine carbon 104 may be mixed with approximately 0.1 to about 0.3 $dm^3$ of aqueous reagent solution 204 to form the oxygen reach impregnated gold-loaded fine carbon 208. Non-limiting examples of concentrations of the hydroxides of alkali metals in the mixture 204 may be approximately 0.05 to about 0.5% over 100% weight of the gold-loaded fine carbon 104 and oxygen reach dopants included may comprise of approximately 0.1 to about 1% over 100% weight of the gold-loaded fine carbon 104. In general, non-limiting example of duration of mixing 204 is approximately from about 10 to about 20 minutes (preferably 15 minutes) at a temperature of approximately 20° C.+/−10° C. (preferably 25° C. (+/−5° C.), which is ambient room temperature).

In general, conventional coarse carbon gold recovery methods 106 (e.g., gold cyanidation) use an aqueous based solution as a medium for the gold recovery process and hence, in most instances, the resulting gold-loaded fine carbon 104 is screened, filtered, or removed out of the entire process mixed within the aqueous based solution. In general, (optionally) it is preferred if the gold-loaded fine carbon 104 is separated 206 from the aqueous based solution prior to processing by the methodologies of the present invention simply because the actual amount of the gold-loaded fine carbon 104 collected takes much less space to store for later processing than the entire aqueous based solution mixture that includes the gold-loaded fine carbon 104. The optional step of filtering, removal, or separation 206 of the gold-loaded fine carbon 104 from the aqueous based solution may be accomplished by a variety of well-known manners, non-limiting examples of which may include a simple sedimentation process where the gold-loaded fine carbon 104 settles and is collected at a bottom of a collector tank, and then removed or separated. Another very simple method of separation is to simply allow the aqueous solution to evaporate, leaving behind the gold-loaded fine carbon 104, ready for mixing 204.

As further illustrated in FIG. 2A, the oxygen impregnated gold-loaded fine carbon 208 is then put through a thermo-kinetic chemical activation regime to commence the low temperature oxidation (gasification process 108) of carbonaceous compounds (carbon particles). As stated above, the thermo-kinetic chemical activation regime includes the mechanical treatment of and concurrent thermal application to the oxygen reach impregnated gold loaded fine carbon 208, resulting in chemical activation (oxidation) of carbon particles to form non-carbonaceous gold-bearing residue 110 without vitrification of impurities found in the gold-loaded fine carbon 104.

In general, the mechanical treatment of the impregnated gold-loaded fine carbon 208 is to increase its surface area, increase the concentration of defects of crystal structure graphite, and removal of diffusion drag during chemical reaction, which may be accomplished by milling of the oxygen impregnated gold-loaded fine carbon 208 to small particle sizes that are less than 100 micron, preferably to about 50 to 60 microns. The diffusion drag is the result of film, layer, or covering of residue on the surface of the remaining oxygen impregnated gold-loaded fine carbon 208 due to further milling and application of heat. The diffusion drag is the impedance or slowing down of penetration of oxygen gas and heat into the remaining oxygen impregnated gold-loaded fine carbon 208. The diffusion drag therefore, impedes the gasification of the carbon particles of the oxygen impregnated gold-loaded fine carbon 208, and is removed by the applied mechanical motion of the milling balls 218 impacted against the fine carbon 208. In other words, the residue that causes the diffusion drag is mechanical removed when milling elements 218 come into contact with the oxygen impregnated gold-loaded fine carbon 208 to further mill the oxygen impregnated gold-loaded fine carbon 208.

In general, the concurrent thermal application of the thermo-kinetic chemical activation regime (concurrent in relation to the mechanical treatment) may include heating the impregnated gold-loaded fine carbon 208 to a temperature of less than 650° C., preferably to about 500° C.+/−50° C. (to avoid vitrification) for a predetermined time (about 4 to 4.5 hours). The chemical activation occurs when the sources of oxygen (the dopans added to the aqueous reagent solution 202) actively isolate oxygen at proper temperature and mechanical activation within the defected areas of the carbon (due to mechanical treatments), oxidizing (gasifying) the graphite-like parts of the carbon particles within the gold-loaded fine carbon.

As further illustrated in FIG. 2A, processing the impregnated gold-loaded fine carbon 208 through the thermo-kinetic chemical activation regime includes the use of a rotary mill-kiln 210 in accordance with the present invention for oxidation of carbon. The rotary mill-kiln 210 of the present invention includes a rotating body 212 that has a milling zone 214 that mill the impregnated oxygen reach gold-loaded fine carbon 208 into small size particles of less than 100 micron (preferably 50 to 60 microns), with the milling zone 214 including a heat source 216 (electric or combustion) for application of thermal energy to generate heat at approximate temperatures of about 450° C. to 550° C. for sufficient duration (about 4 to 4.5 hours) for conversion of impregnated gold-loaded fine carbon 208 into non-carbonaceous gold-bearing residue 110. In general, the mechanical milling of the impregnated gold-loaded fine carbon 208 leads to irregular solid structures that serve to increase the speed or rate of oxidation of carbon (increase reactivity). The gold from the residue 110 may be recovered by well-known conventional gold recovery methods 106 (FIG. 2B).

As further illustrated in FIG. 2A, the rotating body 212 of the rotary mill-kiln 210 of the present invention includes milling elements (or ball mills) 218 that freely move within the milling zone 214 of the rotating body 212 to grind and crush the impregnated gold-loaded fine carbon 208. The rotating body 212 is comprised of a cylindrical vessel that has a central longitudinal pivot axis 220 about which the rotating body 212 pivots. The cylindrical vessel has an ingress end (or loading chamber) 222 and an egress end (unloading chamber) 224 that rest on a set of rotation mechanisms 226 that cause the rotation of the cylindrical vessel 212 about the central longitudinal pivot axis 220. In general, the rotational mechanism 226 may comprise of well-known members such as rollers, motors, etc. to facilitate in rotation of the body 212. The entire rotary mill-kiln 210 may rest on a base-stand 228 at a slight sloping angle, with the ingress side at a higher elevation than the egress side.

Figure 3A:
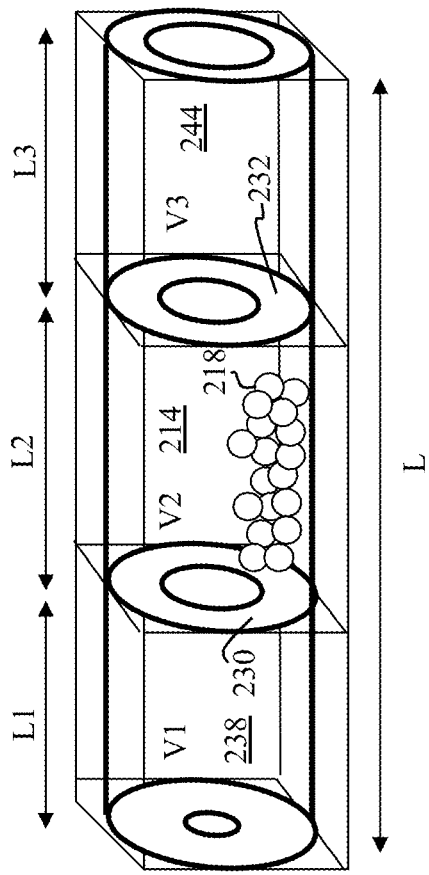
FIGS. 3A and 3B are non-limiting, exemplary schematic illustrations of a cylindrical vessel shown in FIG. 2A, including an exemplary disc in accordance with the present invention.
Figure 3B:
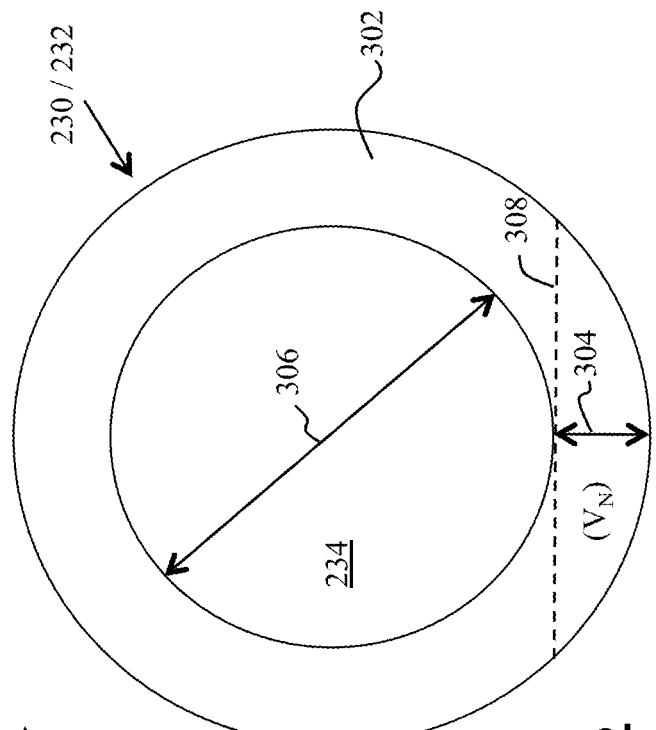

As indicated above, the cylindrical vessel 212 of the rotary mill-kiln 210 includes the milling elements 218 therein that freely move and are maintained within a partition section (the milling zone) 214 of the cylindrical vessel 212 by a set of partitions 230 and 232. The partitions 230 and 232 are comprised of disc-like structures (best illustrated in FIGS. 3A and 3B) with at least one hole 234, and are coupled with the interior surface of the cylindrical vessel 212 by a variety of means, including, for example, welding the discs 230 and 232 to the interior surface of the cylindrical vessel 212. In general, the diameter 306 of the hole 234 of the disc-like structures 230 and 232 is of sufficient size that allows the passage of oxygen impregnated gold-loaded fine carbon 208 while maintaining the milling balls 218 within the partitioned section 214. In other words, the solid body portion 302 of the disc-like structures 230 and 232 has sufficient height 304 that block the milling elements (or balls) 218 from moving outside the partitioned section 214. That is, the milling balls 218 have sufficient weight that cannot overcome the height 304 of the discs 230 and 232 during rotation of the cylindrical vessel 212 (which moves milling balls 218 within the partitioned chamber 214). It is preferable if the partitions 230 and 232 are coupled with the interior surface of the cylindrical vessel 212 at an orientation that is generally perpendicular to the central longitudinal pivot axis 220, with the hole 234 at the center of the discs 230 and 232. It should be noted that the discs 230 and 232 need not have a single hole, but may comprise of a plurality of smaller holes, forming a grill-like structure instead of the single hole 234, with diameters of the grill openings small enough that would continue to block the exit of the milling elements 218 from the partitioned chamber 214. Alternatively, the hole 234 may be eccentric (off-centered) so long as the body 302 of the discs 230 and 232 continue to maintain the milling elements 218 within the partitioned chamber 214.

Referring back to FIG. 2A, as the cylindrical vessel 212 of the rotary mill-kiln 210 rotates about its axis 220 (the discs 230 and 232 welded to the interior surface thereof also rotate), the milling balls 218 move within the partitioned chamber 214 to mill the oxygen reach impregnated gold-loaded fine carbon 208 and hence, provide the required mechanical impact (milling) of the thermo-kinetic chemical activation regime of the present invention. Concurrently, heat at a temperature of about 500° C.+/−50° C. is also supplied via the heat source 216 to provide the required thermo-chemical activation of the thermo-kinetic chemical activation regime of the present invention for gasification of the oxygen reach impregnated gold-loaded fine carbon 208.

As illustrated in FIG. 2A, oxygen reach impregnated gold-loaded fine carbon 208 enters the rotary mill-kiln 210 via a feed 236 and is moved into the first zone or chamber 238 by an augur 240 through the ingress end (or loading chamber) 222. The first zone or chamber 238 may be thought of as an initial drying zone within which the oxygen reach impregnated gold-loaded fine carbon 208 is substantially dried by thermal application of heat via a heat source 242 (electric or combustion) at an approximate temperature of about 200° C. for a sufficient duration (about 0.5 hour) for substantial removal of moisture (to evaporate water). It should be noted that the process of heating at 200° C. also commences and aids in the oxidation of carbons. Thereafter, the substantially dried oxygen reach impregnated gold-loaded fine carbon 208 is passed through the hole 234 of the first disc 230 and into the milling zone 214.

As further illustrated in FIG. 2A, the cylindrical vessel 212 further includes the final oxidation zone 244 that continues to apply thermal energy in a form of heat at an approximate temperature of about 450° C. to 550° C. via a heat source 246 (electrical or combustion) for predetermined time of about 1 to about 1.5 hours, where non-carbonaceous gold-bearing residue 110 exits via the egress end (unloading chamber) 224 and is collected and process by conventional gold recovery process 106 for extraction of gold 102. Most gases (including water vapor) are exhausted through the exhaust 250.

In general, any one or more of the following non-catalyst chemical reactions (gasification) may occur (or concurrently occur) in any one or more of the partitioned zones 238, 214, and 244 in relation to the carbon particles of the oxygen reach impregnated gold-loaded fine carbon 208:

$$C_{(solid)} + O_2 => CO_2 Q(94 \text{ kcal})$$

$$2C_{(solid)} + O_2 => 2CO + Q(52.8 \text{ kcal})$$

$$C_{(solid)} + CO_2 => 2CO - (Q(41.2 \text{ kcal}))$$

$$C_{(solid)} + H_2O_{(gas)} => CO + H_2 - Q(31.4 \text{ kcal})$$

$$C_{(solid)} + 2H_2O_{(gas)} => CO_2 + H_2 - Q(21.6 \text{ kcal})$$

resulting in the non-carbonaceous gold-bearing residue 110, where C is carbon, O is oxygen, H is hydrogen, Q is energy (with "+Q" being exothermic and "−Q" being endothermic). The above reactions may be generalized as follows where Sold+Gas=>Gaseous Products+non-carbonaceous gold-bearing residue 110. It should be noted that water (H$_2$O) is the result of the mixture of the gold-loaded fine carbon 104 with the aqueous reagent solution 202 at mixing 204, which forms the oxygen impregnated gold-loaded fine carbon 208.

Examples of the above described thermo-kinetic chemical activation regime in accordance with the present invention are presented in tabular form in Table 1.

TABLE 1

Processing of Gold-Loaded Fine Carbon

| Batch # | Partitioned Chamber 214 Regime (Temperature & Time) | Mass Loss, % | Au Yield, % |
|---|---|---|---|
| 1 | 350° C. to 370° C. and 3 Hours | 23 | 85.4 |
| 2 | 400° C. to 450° C. and 4 Hours | 22.4 | 89 to 90 |
| 3 | 450° C. to 500° C. and 4 Hours | 24 | 91 to 92 |
| 4 | 500° C. to 520° C. and 4.5 Hours | 25 | 97 to 98 |

For the above examples shown in table 1, a single batch of gold-loaded fine carbon 104 was used and divided into four smaller, substantially equal batches, with each smaller batch processed separately. It should be noted that batch #2 had lesser amount of gold-loaded fine carbon 104 and hence, the reason for lesser mass loss. Nonetheless, the percentage of gold yielded for this batch #2 is about 89% to 90%, which is higher than the first batch due to higher temperature and duration of thermo-kinetic chemical activation processing.

As indicated in the above table 1, in order to extract the highest percentage of gold (batch #4), the optimum temperature and time for the middle partitioned chamber or zone 214 is approximately at 500° C. to 520° C. for about 4.5 hours, which generates a mass loss of about 25% (gasification of carbon), with a gold yield of about 97% to 98%. The optimum temperature and time (batch #4) for the first partitioned chamber 238 is at approximate temperature of about 200° C. for about 0.5 hours, and the optimal temperature and time (batch #4) for the final partitioned chamber 244 operations is at approximately 500° C. to 520° C. for about 1 hour. Stated otherwise, the total optimal operation time (batch #4) through the thermo-kinetic chemical activation process in accordance with the present invention is approximately 6 hours. It should be noted that although optimally the entire process takes place in about 6 hours, the second zone 214 preferably has a minimum processing time of about 4 to 4.5 hours, with the rest of the other two zones 238 and 244 dividing the remaining time preferably, with the zone 238 being about 0.5 hour and zone 244 about 1.5 hours.

The rate at which (and the amount of) the oxygen impregnated gold-loaded fine carbon 208 that is fed into the rotary mill-kiln 210, and the rate at which (and the amount of) the oxygen impregnated gold-loaded fine carbon 208 that is processed through each partitioned chamber or zone 238, 214, and 244 depends on many factors, including the dimensions of the rotary mill-kiln 210.

In general, the time $\tau_1$ it takes for any other matter or substance to enter, pass through, and exit a well known, conventional, average sized rotary-kiln (which are not partitioned and do not have a milling zone) would be substantially shorter (than 4 hours), which is dictated by the following formula:

$$\tau_1 = \frac{0.19L}{nSD},$$

wherein L is the axial length of the entire cylindrical vessel of a conventional rotary kiln, n is the number of rotations per minute, S is the inclinations (or slope) of the cylindrical vessel (with the ingress side at a higher elevation than the egress side), and D is the inner diameter of the cylindrical vessel. Accordingly, it would be appreciated by those skilled in the art that the time $\tau_1$ for processing matter within a conventional rotary kiln is not sufficient and hence, should be longer than or be modified to some other time $\tau_2$ (e.g., minimum of about 4 hours) that is required for the completion of the thermo-kinetic chemical activation regime of the present invention. Therefore, the present invention has modified the conventional rotary kiln into the illustrated rotary mill-kiln 210 by the partitioning discs 230 and 232, which slow the travel time of the oxygen impregnated gold-loaded fine carbon 208 through the cylindrical vessel 212 to the preferred time of about 6 hours, which means $\tau_2 > \tau_1$. Accordingly, the partitioning discs 230 and 232 server to contain the milling elements 218 within the partitioned chamber 214 (as indicated above) and also serve to slow the travel time of the oxygen impregnated gold-loaded fine carbon 208 throughout the entire axial length L of the cylindrical vessel 212. In the exemplary rotary mill-kiln 210 illustrated in accordance with the present invention, the non-limiting, exemplary dimensions used for experiments indicated in table 1 above may be as follows:

| Partitioned Chamber 238 | | Partitioned Chamber 214 | | Partitioned Chamber 244 | |
|---|---|---|---|---|---|
| L1 = 0.5 m | V1 = 0.15 m$^3$ | L2 = 4 m | V2 = 1.2 m$^3$ | L3 = 1.5 m | V3 = 0.45 m$^3$ |

In general, the height 304 (FIGS. 3A and 3B) of the body 302 of the discs 230 and 232 creates a barrier, which generates the maximum amount or volume $V_N$ of the oxygen impregnated gold-loaded fine carbon 208 that may be maintained and processed within each chamber 238, 214, and 244 without the fine carbon 208 exiting the respective chamber and into the next, subsequent chamber through hole 234 of the discs 230 and 232. (The highest level is at the tangent line 308 shown in FIG. 3B, above which, the oxygen impregnated gold-loaded fine carbon 208 will spill over the next, subsequent chamber.) Therefore, the rate at which (and the amount of) the oxygen impregnated gold-loaded fine carbon 208 that is fed into the rotary mill-kiln 210, and the rate at which (and the amount of) the oxygen impregnated gold-loaded fine carbon 208 that is processed through each chamber or zone 238, 214, and 244 depends on the capacity of each chamber in terms of volume $V_N$ (V1, V2, and V3—best shown in FIG. 3A) created within the respective chambers 238, 214, and 244 by the height 304 of body 302 of each disc 230 and 232, the longitudinal axial length $L_N$ of each chamber 238, 214, and 244, and the arc of the cylindrical vessel 212. In the instant invention, the chamber 238 has the shortest length L1, the milling zone or chamber 214 has longest length L2, and the final zone or chamber 244 has a length L3 with a span that is between the lengths L1 and L2 of the respective first and second chambers 238 and 214, with the height 304 being the same for all partitions. This results in the travel time for the oxygen impregnated gold-loaded fine carbon 208 through each respective chamber 238, 214, and 244 is equal to about 0.5 hours for the first chamber 238, about 4 hours for the milling zone chamber 214, and about 1.5 hours for the final zone 244. Therefore, increasing the volume $V_N$ or capacity for each chamber would allow for processing of a larger amount of the oxygen impregnated gold-loaded fine carbon 208 within the preferred minimum 4 hours, and decreasing the volume $V_N$ would require processing of lesser amount of the oxygen impregnated gold-loaded fine carbon 208 within the preferred minimum 4 hours.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. For example, the partitioning of the cylindrical vessel 212 in accordance with the present preferred embodiment enables continuous operation (processing) of the oxygen impregnated gold-loaded fine carbon 208. However, alternatively, it is possible to remove the partitions 230 and 230, increase the number of milling elements 218 so that they are spread throughout the interior chamber of the cylindrical vessel (i.e., the entire cylindrical vessel 212 becomes chamber 214), and allow a batch processing (thermo-kinetic chemical activation in batches) of the oxygen impregnated gold-loaded fine carbon 208. In this alternative method, each batch is processed for duration of about 4 to 6 hours at an approximate temperature of 500° C. (+/−50° C.). Of course, continuous processing is more efficient and therefore, preferred over batch processing. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

What is claimed is:

1. A method for recovering gold from gold-loaded fine carbon, comprising:
   impregnating gold-loaded fine carbon with oxygen using an aqueous reagent solution comprised of hydroxides of alkali metals and one or more sources of oxygen to form oxygen impregnated gold-loaded fine carbon;
   gasifying of carbon particles of the oxygen impregnated gold-loaded fine carbon to form non-carbonaceous gold-bearing residue M.

2. The method for recovering gold from gold-loaded fine carbon as set forth in claim 1, wherein:
   the non-carbonaceous gold-bearing residue M is formed as follows:

$$MC+O_2 => M+CO_2$$

where C is carbon, O is oxygen.

3. The method for recovering gold from gold-loaded fine carbon as set forth in claim 1, wherein:
   the sources of oxygen are from oxygen rich dopants.

4. The method for recovering gold from gold-loaded fine carbon as set forth in claim 3, wherein:
   the oxygen rich dopants are selected from nitrates, persulfates, or permanganates.

5. The method for recovering gold from gold-loaded fine carbon as set forth in claim 3, wherein:
   concentrations of the hydroxides of alkali metals are 0.05 to 0.5% over 100% weight of the fine carbon and oxygen rich dopants 0.1 to 1% over 100% weight of the gold-loaded fine carbon.

6. The method for recovering gold from gold-loaded fine carbon as set forth in claim 1, wherein:
   preparing the aqueous reagent solution includes:
   dissolving a predetermined quantity of hydroxides of alkali metals in water to form an aqueous solution of hydroxides of alkali metals;
   adding of oxygen dopants to the aqueous solution of hydroxides of alkali metals to form the aqueous reagent solution;
   adding the gold-loaded fine carbon to the aqueous reagent solution while mixing the aqueous reagent solution.

7. The method for recovering gold from gold-loaded fine carbon as set forth in claim 6, wherein:
   duration of mixing is approximately from about 10 to about 20 minutes, at a temperature of approximately about 20° C.+/−10° C.

8. The method for recovering gold from gold-loaded fine carbon as set forth in claim 1, wherein:
   approximately 1 kg of the gold-loaded fine carbon is mixed with approximately 0.1 to about 0.3 dm$^3$ of aqueous reagent solution.

9. The method for recovering gold from gold-loaded fine carbon as set forth in claim 1, wherein:
   gasifying includes:
   processing the impregnated gold-loaded fine carbon through a thermo-kinetic chemical activation regime that includes:
   mechanical treatment and concurrent thermal application of the impregnated gold loaded fine carbon, resulting in oxidation of carbon particles to form non-carbonaceous gold-bearing residue M without vitrification of impurities found in the gold-loaded fine carbon.

10. The method for recovering gold from gold-loaded fine carbon as set forth in claim 9, wherein:
    the mechanical treatment of the impregnated gold-loaded fine carbon includes increasing surface area of the gold-loaded fine carbon.

11. The method for recovering gold from gold-loaded fine carbon as set forth in claim 10, wherein:

increasing the surface area of the impregnated gold-loaded fine carbon includes milling of the impregnated gold-loaded fine carbon to small particle sizes that is less than 100 micron.

12. The method for recovering gold from gold-loaded fine carbon as set forth in claim 9, wherein:

the thermal application includes heating the impregnated gold-loaded fine carbon to a temperature of less than 650° C.

13. The method for recovering gold from gold-loaded fine carbon as set forth in claim 1, wherein:

a processing the impregnated gold-loaded fine carbon through a thermo-kinetic chemical activation regime includes the use of a kiln.

14. The method for recovering gold from gold-loaded fine carbon as set forth in claim 13, wherein:

the kiln is a rotary mill-kiln.

15. The method for recovering gold from gold-loaded fine carbon as set forth in claim 14, wherein:

the rotary mill-kiln is comprised of:

a rotating body that has a milling zone that grinds the gold-loaded fine carbon into small size particles of less than 100 micron, with the milling zone including a heat source for application of thermal energy at approximate temperatures of about 450° C. to 550° C. for sufficient duration of about 4 to 6 hours for conversation gold-loaded fine carbon into non-carbonaceous gold-bearing residue M.

16. The method for recovering gold from gold-loaded fine carbon as set forth in claim 15, wherein:

the rotating body includes milling elements that freely move within the milling zone of the rotating body of the kiln to grind and crush the gold-loaded fine carbon.

17. The method for recovering gold from gold-loaded fine carbon as set forth in claim 16, wherein:

the milling elements are ball mills that are used as a grinder.

18. The method for recovering gold from gold-loaded fine carbon as set forth in claim 17, wherein:

the rotating body is comprised of a cylindrical vessel that has a central longitudinal pivot axis about which the rotating body pivots.

19. The method for recovering gold from gold-loaded fine carbon as set forth in claim 18, wherein:

the cylindrical vessel has an ingress end and an egress end that rest on a set of rotation mechanisms that cause the rotation of the cylindrical chamber about the central longitudinal pivot axis.

20. The method for recovering gold from gold-loaded fine carbon as set forth in claim 19, wherein:

the heat source is one of electrical heat source and combustion heat source.

21. The method for recovering gold from gold-loaded fine carbon as set forth in claim 20, wherein:

the cylindrical vessel further includes an initial drying zone.

22. The method for recovering gold from gold-loaded fine carbon as set forth in claim 21, wherein:

the impregnated gold-loaded fine carbon is substantially dried within the initial drying zone by thermal application of heat.

23. The method for recovering gold from gold-loaded fine carbon as set forth in claim 22, wherein:

the thermal application of heat is at an approximate temperature of about 200° C. for a sufficient duration for about 0.5 hours for substantial removal of moisture.

24. The method for recovering gold from gold-loaded fine carbon as set forth in claim 23, wherein:

the cylindrical vessel further includes an final oxidation zone that continues to apply thermal energy at approximate temperatures of about 450° C. to 550° C. for a sufficient duration of about 1 to 1.5 hours.

25. The method for recovering gold from gold-loaded fine carbon as set forth in claim 24, wherein:

the cylindrical vessel of the kiln includes milling elements therein that freely move and are maintained within a partition section of the cylindrical vessel by a set of partitions.

26. A method for recovering gold from gold-loaded fine carbon, comprising:

impregnating gold-loaded fine carbon with hydroxides of alkali metals; and gasifying of carbon particles of the impregnated gold-loaded fine carbon.

27. A method for recovering gold from gold-loaded fine carbon, comprising:

impregnating gold-loaded fine carbon with one or more oxidation facilitator compounds and one or more sources of oxygen to form oxygen rich gold-loaded fine carbon;

gasifying of carbon particles of the oxygen rich gold-loaded fine carbon, which results in a non-catalytic chemical reaction to form a non-carbonaceous gold-bearing residue M.

28. The method for recovering gold from gold-loaded fine carbon as set forth in claim 27, wherein:

the non-carbonaceous gold-bearing residue M is formed as follows:

$$MC + O_2 \Rightarrow M + CO_2$$

where C is carbon, O is oxygen; and recovering gold from non-carbonaceous gold-bearing residue M.

29. The method for recovering gold from gold-loaded fine carbon as set forth in claim 27, wherein:

gasifying of carbon particles of the oxygen rich gold-loaded fine carbon is by a thermo-kinetic non-catalytic chemical activation regime.

* * * * *